(12) United States Patent
Raczek et al.

(10) Patent No.: US 9,030,067 B2
(45) Date of Patent: May 12, 2015

(54) BEARING ROTATIONAL LOCK

(75) Inventors: John Raczek, Weston, WI (US); Scott Wright, Wausau, WI (US); Mark Bartz, Wausau, WI (US); C. Scott Eagleton, Wausau, WI (US); Jeffrey P. Nelessen, Merrill, WI (US); Gerald R. Muehlbauer, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 986 days.

(21) Appl. No.: 13/110,153

(22) Filed: May 18, 2011

(65) Prior Publication Data

US 2011/0285251 A1 Nov. 24, 2011

Related U.S. Application Data

(60) Provisional application No. 61/346,794, filed on May 20, 2010.

(51) Int. Cl.
| | |
|---|---|
| H02K 5/00 | (2006.01) |
| F16C 35/00 | (2006.01) |
| F16C 23/08 | (2006.01) |
| F16C 35/077 | (2006.01) |
| H02K 5/173 | (2006.01) |

(52) U.S. Cl.
CPC .............. *F16C 23/08* (2013.01); *F16C 35/077* (2013.01); *H02K 5/1732* (2013.01); *Y10S 384/906* (2013.01)

(58) Field of Classification Search
CPC .... F16C 35/077; F16C 35/067; H02K 5/1732
USPC ............................................ 310/90; 384/908
See application file for complete search history.

(56) References Cited

U.S. PATENT DOCUMENTS

| | | | | |
|---|---|---|---|---|
| 4,046,432 | A | * | 9/1977 | Hofmann et al. ............. 384/510 |
| 5,482,384 | A | | 1/1996 | Lyle |
| 5,967,673 | A | | 10/1999 | Kenney, Jr. et al. |
| 6,270,260 | B1 | | 8/2001 | Hale |
| 6,491,131 | B1 | * | 12/2002 | Appleyard .................... 180/444 |

\* cited by examiner

*Primary Examiner* — Tran Nguyen
(74) *Attorney, Agent, or Firm* — Armstrong Teasdale LLP

(57) ABSTRACT

A bearing assembly for an electric motor is provided that includes a bearing having an inner race and an outer race, and a bearing float sleeve having an outer race engaging member. The outer race engaging member includes an outer surface sized for slip fit engagement with a bearing seat formed in a motor end member such that the bearing float sleeve can be displaced axially in relation to the bearing seat and an inner surface configured for engagement with the bearing outer race such that the bearing outer race is in a fixed rotational position with respect to the bearing float sleeve. The bearing float sleeve includes at least one feature operational to maintain a fixed rotational position of the bearing float sleeve with respect to the motor end member.

21 Claims, 8 Drawing Sheets

BEARING ROTATIONAL LOCK

CROSS-REFERENCE TO RELATED APPLICATIONS

This application claims the benefit of U.S. Provisional Patent Application Ser. No. 61/346,794 filed May 20, 2010, the contents of which are hereby incorporated by reference.

BACKGROUND OF THE INVENTION

The field of the invention relates generally to bearing configurations in motors and generators, and more specifically to a bearing rotational lock that prevents an outer race of a bearing from rotating while still allowing axial movement of the bearing and the shaft to which it is attached.

Current designs utilize either loading springs to apply a friction force on the side of a bearing outer race to prevent rotation, or a loading spring on the outer diameter of the bearing outer race to provide a friction force to prevent rotation. In another solution, an axial notch is created in the outer race of the bearing where a locking mechanism may be inserted to prevent the rotation of the outer race of the bearing.

Rotation of the outer race of a ball bearing is known to cause wear in the inner surface of the bearing bore which in turn can cause catastrophic failure in a rotating assembly when the wear grows to a point where the rotating components are allowed to contact the stationary components in the assembly. Rotation of the outer race also is known to produce additional heat buildup within the bearing degrading the grease life and causing bearing failures.

BRIEF DESCRIPTION OF THE INVENTION

In one aspect, a bearing assembly for an electric motor is provided that includes a bearing having an inner race and an outer race and a bearing float sleeve having an outer race engaging member. The outer race engaging member includes an outer surface sized for slip fit engagement with a bearing seat formed in a motor end member such that the bearing float sleeve can be displaced axially in relation to the bearing seat and an inner surface configured for engagement with the bearing outer race such that the bearing outer race is in a fixed rotational position with respect to the bearing float sleeve. The bearing float sleeve includes at least one feature operational to maintain a fixed rotational position of the bearing float sleeve with respect to the motor end member.

In another aspect, a method for preventing relative rotation between an outer race of a bearing and a bearing seat formed in a motor end member of an electric motor is provided. The method includes engaging the outer race of the bearing with an inner surface of a bearing float sleeve such that the bearing outer race is in a fixed rotational position with respect to the bearing float sleeve, engaging a bearing engaging surface of the bearing seat with an outer surface of the bearing float sleeve. The outer surface is sized such that the bearing float sleeve can be displaced axially in relation to the bearing seat. The method also includes providing an engagement between the bearing float sleeve and the motor end member such that the bearing float sleeve and the motor end member are in a fixed rotational position with respect to one another.

In still another aspect, an electric motor is provided that includes a motor end member having a bearing seat formed therein, the bearing seat including a bearing engaging surface, a bearing including an inner race and an outer race, and a bearing float sleeve including an outer race engaging member. The outer race engaging member has an outer surface sized for slip fit engagement with the bearing engaging surface such that the bearing float sleeve can be displaced axially in relation to the bearing seat and an inner surface configured for engagement with the outer race such that the bearing outer race is in a fixed rotational position with respect to the bearing float sleeve. The bearing float sleeve includes at least one feature operational to maintain a fixed rotational position of the bearing float sleeve with respect to the motor end member.

The features, functions, and advantages that have been discussed can be achieved independently in various embodiments or may be combined in yet other embodiments further details of which can be seen with reference to the following description and drawings.

DETAILED DESCRIPTION OF THE INVENTION

Figure 1:
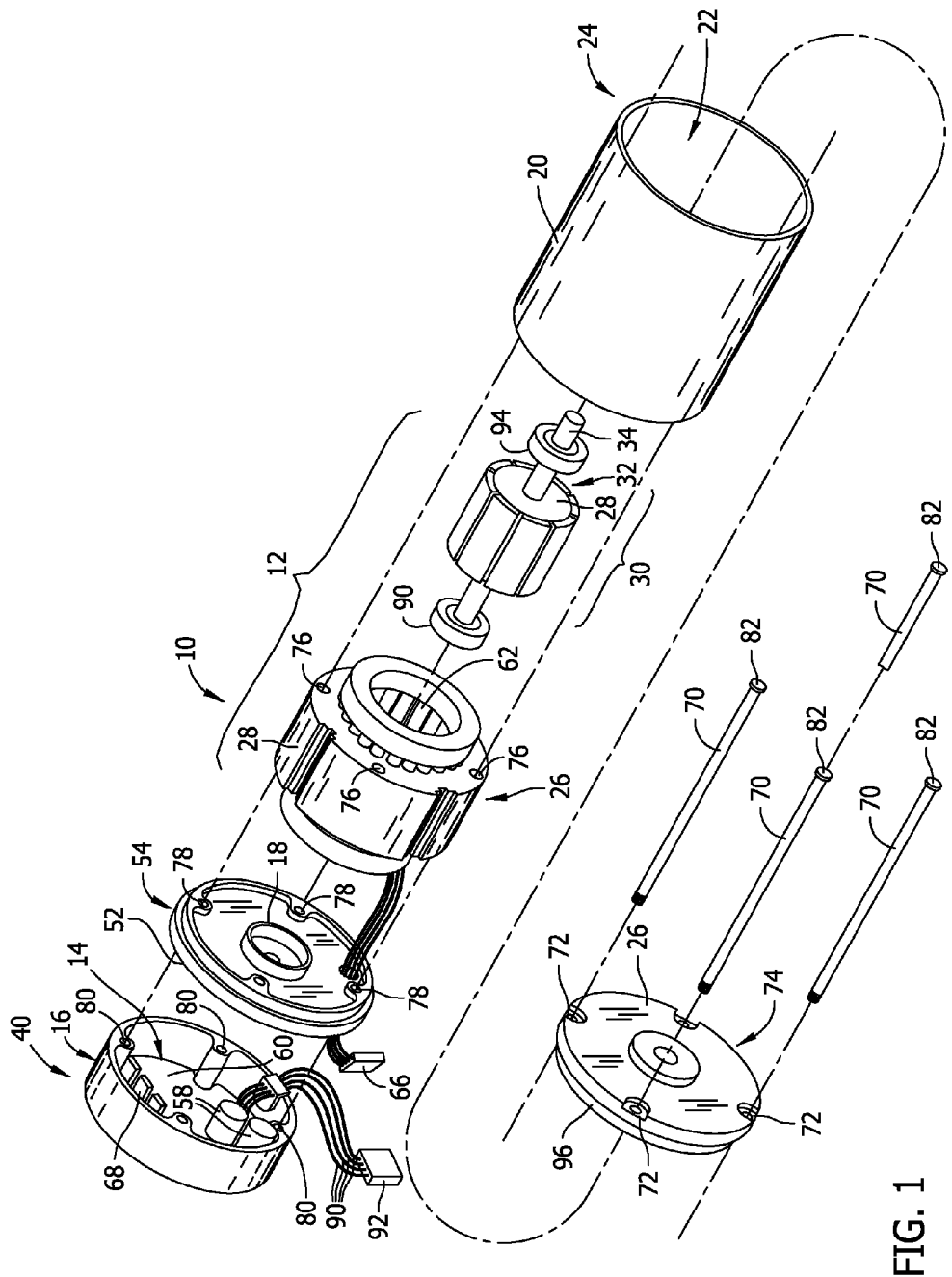
FIG. 1 is an exploded view of an electronically controlled variable speed motor.
Figure 2:
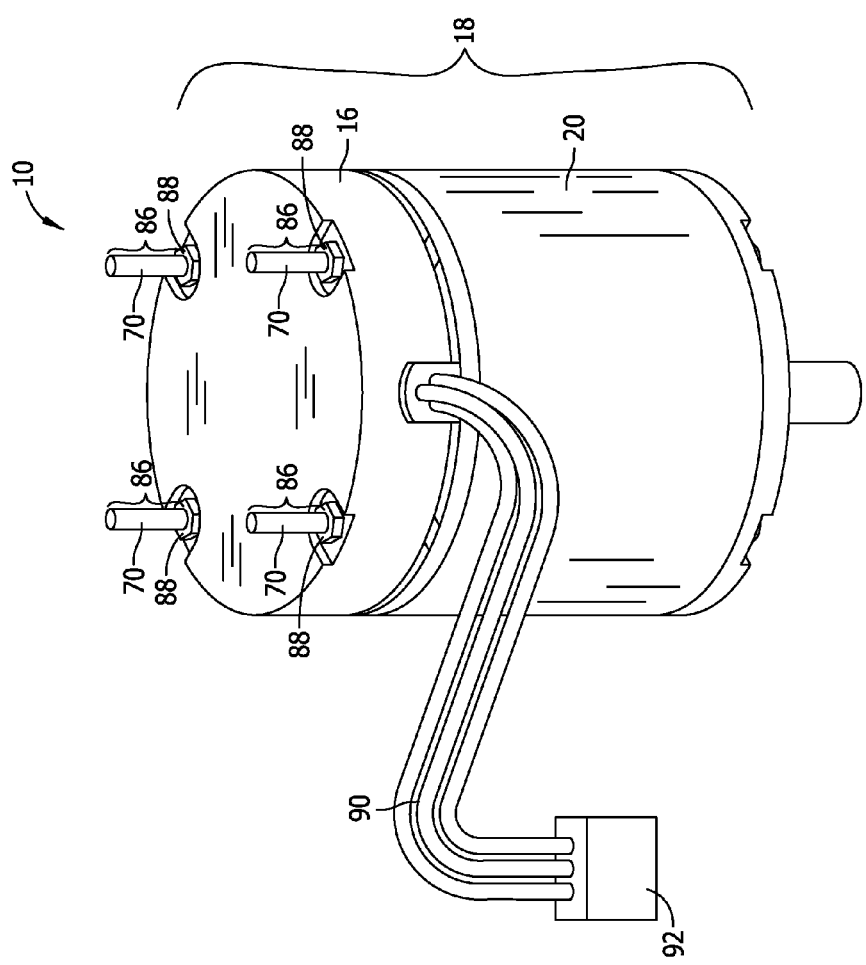
FIG. 2 is a fully assembled view of the motor of FIG. 1.

FIG. 1 is an exploded view of an integrated induction motor and motor controller assembly 10, also referred to herein as motor assembly 10. FIG. 2 illustrates the fully assembled motor assembly 10. Motor assembly 10 includes an induction motor 12 and a motor control unit 14, also referred to herein as motor controller 14. Motor controller 14 is configured to be positioned at least partially within an end cap 16. A motor assembly housing includes end cap 16 and a housing shell 20. Housing shell 20 defines an interior 22 and an exterior 24 of motor assembly 10 and is configured to at least partially enclose and protect motor assembly 10. Motor 12 includes a stationary assembly 26 including a stator or core 28 and a rotatable assembly 30 including a permanent magnet rotor 32 and a shaft 34. A fan (not shown) or other device to be driven engages shaft 34. For example, one embodiment of motor assembly 10 may be coupled to a fan for blowing air over cooling coils and/or a heat exchanger assembly and would be referred to as a blower motor. Another embodiment of motor assembly 10, smaller in size and air moving capacity might be utilized as a draft inducing motor. While the above are two relevant examples, electric motors of the type shown in FIGS. 1 and 2, as well as other electric motor types are used in countless applications, and come in a myriad of sizes and shapes.

Referring again to FIGS. 1 and 2, end cap 16 is mounted on a rear portion 40 of motor assembly 10 to enclose motor controller 14 at least partially within end cap 16. Motor controller 14 is positioned adjacent an outer side 52 of a first end member 54. Motor controller 14 includes a plurality of electronic components 58 and a connector 68 mounted on a component board 60, for example, a printed circuit board. Motor controller 14 is connected to winding stages 62 of stationary assembly 26 by interconnecting a winding end turn connector 66 and a motor control unit connector 68. Motor controller 14 applies a voltage to one or more of winding stages 62 at a time for commutating winding stages 62 in a preselected sequence to rotate rotatable assembly 30 about an axis of rotation.

Connecting elements 70, for example, a plurality of bolts, pass through bolt openings 72 in a second end member 74, bolt openings 76 in core 28, bolt openings 78 in first end member 54, and bolt openings 80 in end cap 16. Heads 82 of connecting elements 70 engage the second end member 74. Connecting elements 70 are adapted to urge second end member 74 and end cap 16 toward each other, thereby supporting first end member 54, stationary assembly 26, and rotatable assembly 30 therebetween. Additionally, housing shell 20 may be positioned between first end member 54 and second end member 74 for enclosing and protecting stationary assembly 26 and rotatable assembly 30.

Although described as including induction motor 12, integrated induction motor and motor control unit assembly 10 may include any suitable type of electric motor or generator including, but not limited to, induction motor 12, a brushless direct current (BLDC) motor, an electronically commutated motor (ECM), a brushless alternating current (BLAC) motor, induction generator, synchronous generator, permanent magnet generator, or a stepper motor.

As described above, FIG. 1 illustrates motor assembly 10 in a fully assembled state. Connecting elements 70 pass through second end member 74, stationary assembly 26, first end member 54, and end cap 16. Connecting elements 70 have a portion 86 which projects laterally from end cap 16. Portion 86 is adapted to engage a support structure (not shown) for supporting the motor assembly 10. Connecting elements 70 may be secured in place by placing a nut 88 engaging the threads on each of portions 86 of connecting elements 70. A wiring harness 90 and a connector 92 are utilized to connect motor assembly 10 to an electrical power source, such as a source of pulse width modulated signals.

Figure 3:
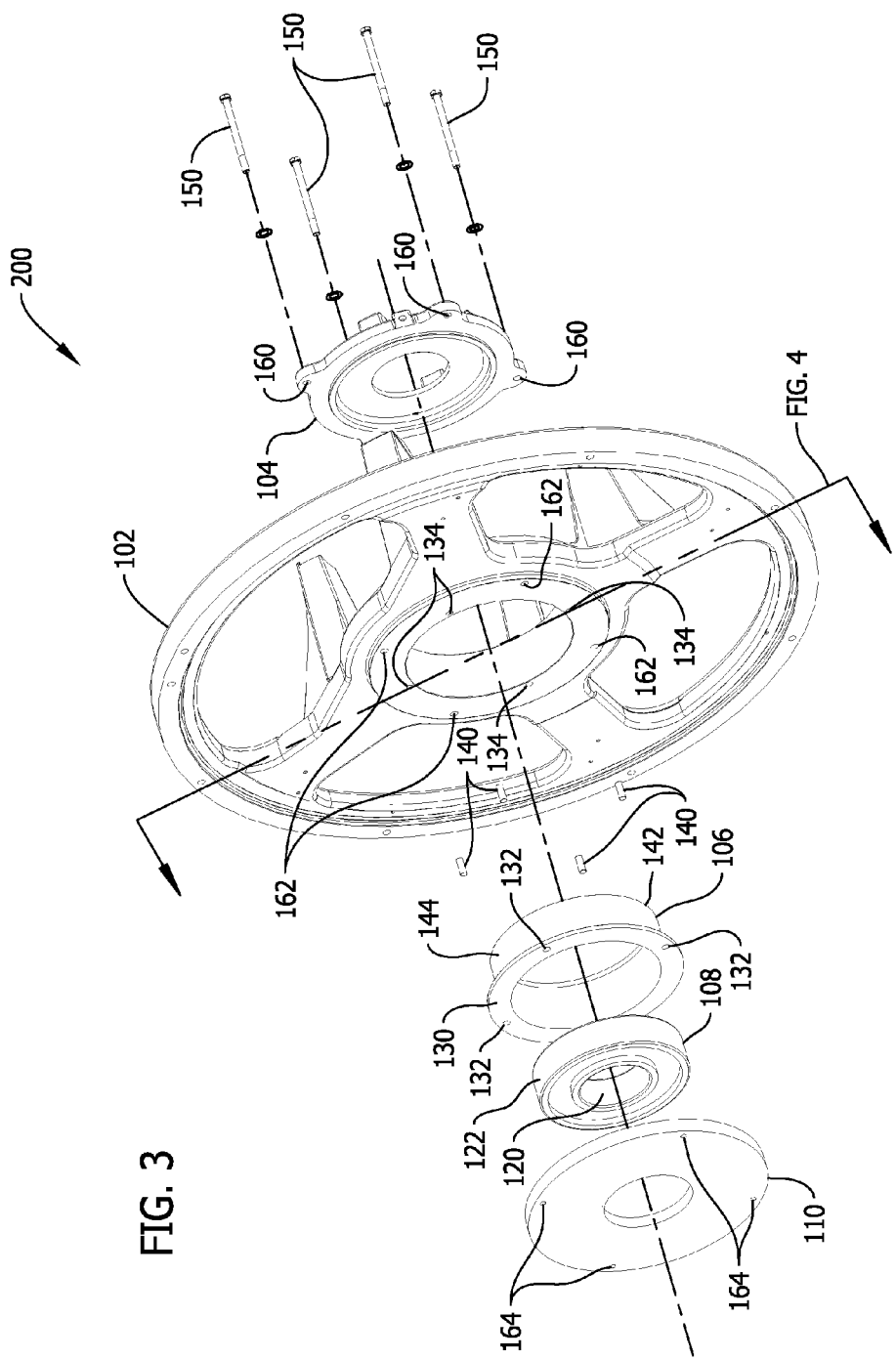
FIG. 3 is an illustration of an exemplary bearing assembly.

The motor assembly 10 of FIGS. 2 and 3 are representative of all motor types in that they incorporate one or more bearings. Referring to again FIG. 1, bearing 90 is configured for placement in a bearing seat 92 of first end member 54, and bearing 94 is configured for placement in a bearing seat 96 of second end member 74. In most motors, placement of bearings is referred to as "seating" and consists of a press fit placement of an outer race of the bearing into the bearing seat. The friction of the press fit generally prevents rotation of the outer race with respect to the end member in which it is seated. However, due to any number of factors, it is possible for outer races to rotate with respect to the end member. While the rotation of the outer race is undesirable, due to the eventual wearing on the end member and the bearing itself, there are motor applications where an amount of axial movement in the shaft, bearing, and end member assembly is expected and desired.

Figure 4:
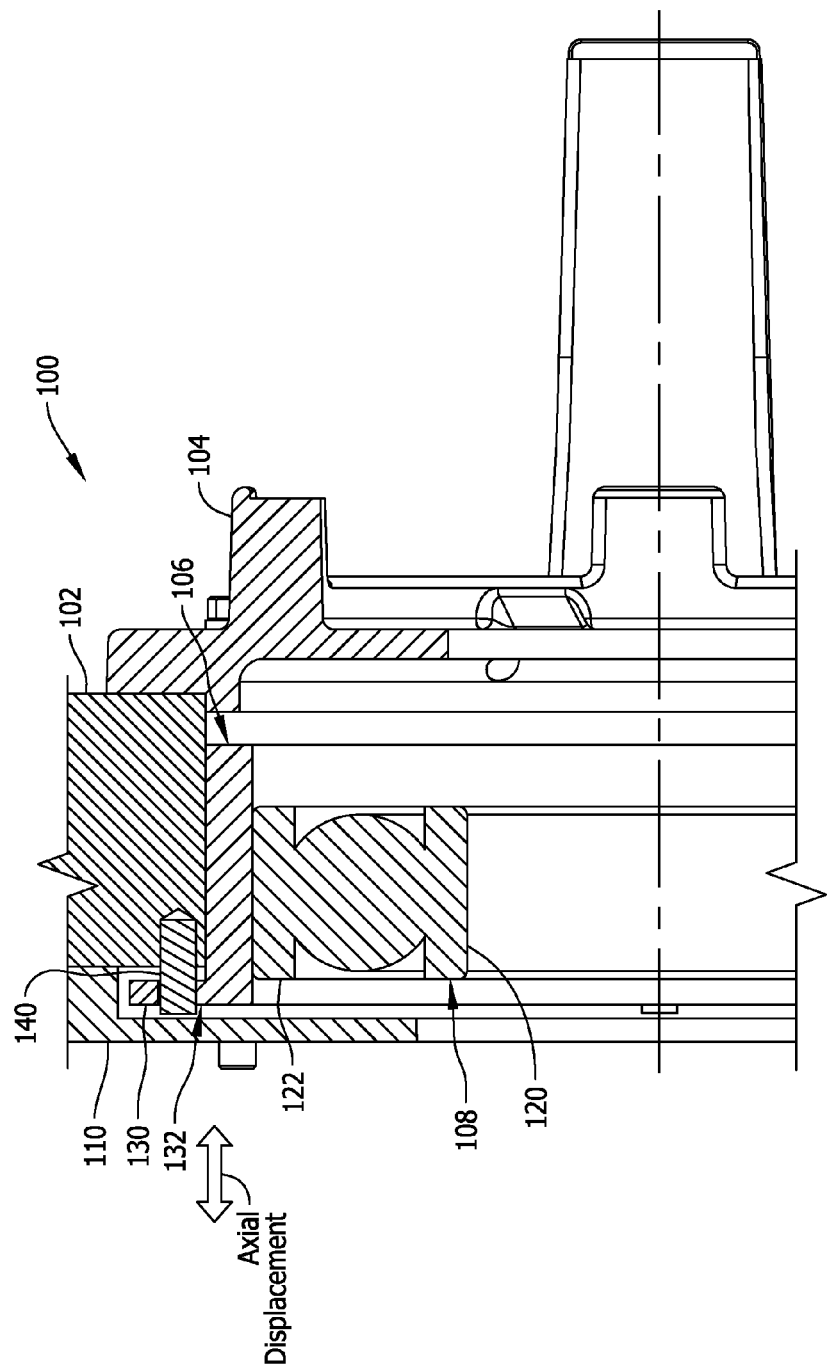
FIG. 4 is an enlarged cross-sectional view of the bearing assembly of FIG. 3.

FIG. 3 is an exploded view of a bearing assembly 100, which may be utilized in any of the motors described and/or mentioned above. FIG. 4 is an enlarged cross-sectional view of the bearing assembly of FIG. 3. For purposes of description, bearing assembly 100 includes a motor end member 102, sometimes referred to as a bracket, an external bearing cap 104, a bearing float sleeve 106, a bearing 108, and an internal bearing cap 110. Bearing 108 includes an inner race 120 and an outer race 122. In embodiments, bearing 108 is a rolling element bearing intended to be installed onto a shaft.

Bearing float sleeve 106 is installed onto the outer race 122 of the bearing 108, and fixed in position with respect to the outer race 122. The bearing float sleeve 106 and bearing 108 are inserted into motor end member 102 of a motor or a generator that has enough clearance to allow for axial displacement (as indicated by the arrow shown in FIG. 4) of the bearing float sleeve 106 with respect to the motor end member 102. The bearing float sleeve 106 is then locked in place such that there is no the rotation of the bearing float sleeve 106 and outer race 122 with respect to the motor end member 102.

In one embodiment, the bearing float sleeve 106 includes a flange 130 with holes 132 therethrough such that dowel pins 140 extending from holes 134 in the motor end member 102 engage the holes 132 in flange 130 to prevent rotational movement of the bearing float sleeve 106 and therefore the outer race 122, as illustrated in FIGS. 3 and 4. Flange 130 extends in a substantially perpendicular direction from an outer race engaging member 142. Outer race engaging member 142 includes an outer surface 144 configured for engagement with a corresponding bearing seat 146 formed in motor end member 102. Outer race engaging member 142 includes an inner surface 148 configured for engagement with the outer race of the bearing 108.

Bolts 150 extend through corresponding holes 160 in external bearing cap 104, corresponding holes 162 in motor end member 102 and corresponding holes 164 in internal bearing cap 110 to maintain an axial position, though with an amount of axial movement, of bearing 108 and bearing float sleeve 106.

Figure 5:
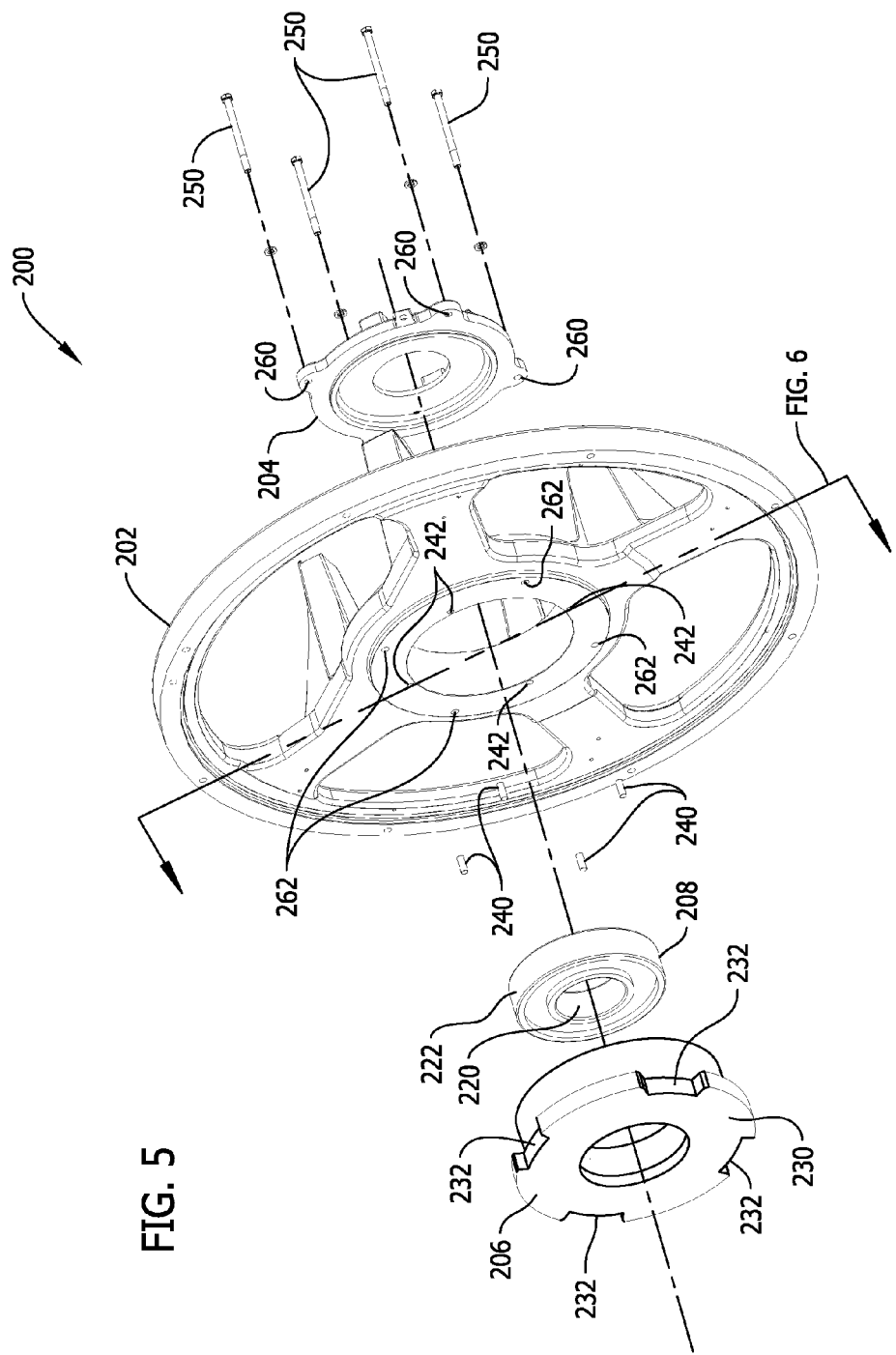
FIG. 5 is an illustration of a second exemplary bearing assembly.
Figure 6:
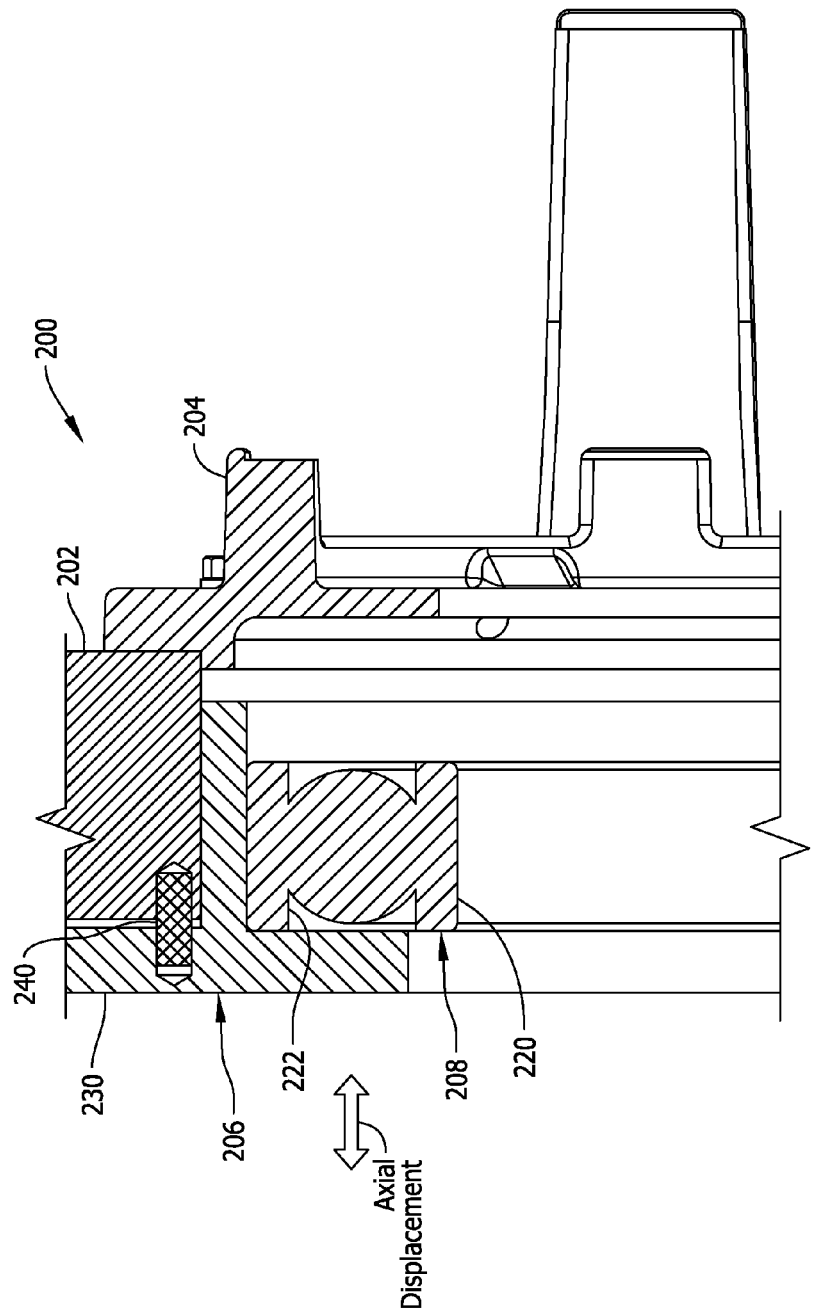
FIG. 6 is an enlarged cross-sectional view of the bearing assembly of FIG. 5.

FIG. 5 is an exploded view of an alternative embodiment of a bearing assembly 200, which also may be utilized in any of the motors described and/or mentioned above. FIG. 6 is an enlarged cross-sectional view of the bearing assembly 200 of FIG. 5. Bearing assembly 200 includes a motor end member 202, sometimes referred to as a bracket, an external bearing cap 204, a bearing float sleeve 206, and a bearing 208. Bearing 208 includes an inner race 220 and an outer race 222. In embodiments, bearing 208 is a rolling element bearing intended to be installed onto a shaft.

Bearing float sleeve 206 is installed onto the outer race 222 of the bearing 208, and fixed in position with respect to the outer race 222. The bearing float sleeve 206 and bearing 208 are inserted into motor end member 202 of a motor or a generator that has enough clearance to allow for axial displacement (as indicated by the arrow shown in FIG. 6) of the bearing float sleeve 206 with respect to the motor end member 202. The bearing float sleeve 206 is then locked in place such that there is no the rotation of the bearing float sleeve 206 and outer race 222 with respect to the motor end member 202. In one embodiment, the bearing float sleeve 206 includes a flange 230 with slots 232 in a plurality of locations about a perimeter of flange 230 such that dowel pins 240 extending from holes 242 in the motor end member 202 engage the slots 232 in flange 230 to prevent rotational movement of the bearing float sleeve 206 and therefore the outer race 222, as illustrated in FIGS. 5 and 6. Bolts 250 extend through corresponding holes 260 in external bearing cap 204 and through holes 262 in the motor end member 102 to maintain an axial position, though with an amount of axial movement, of bearing 208 and bearing float sleeve 206.

Figure 7:
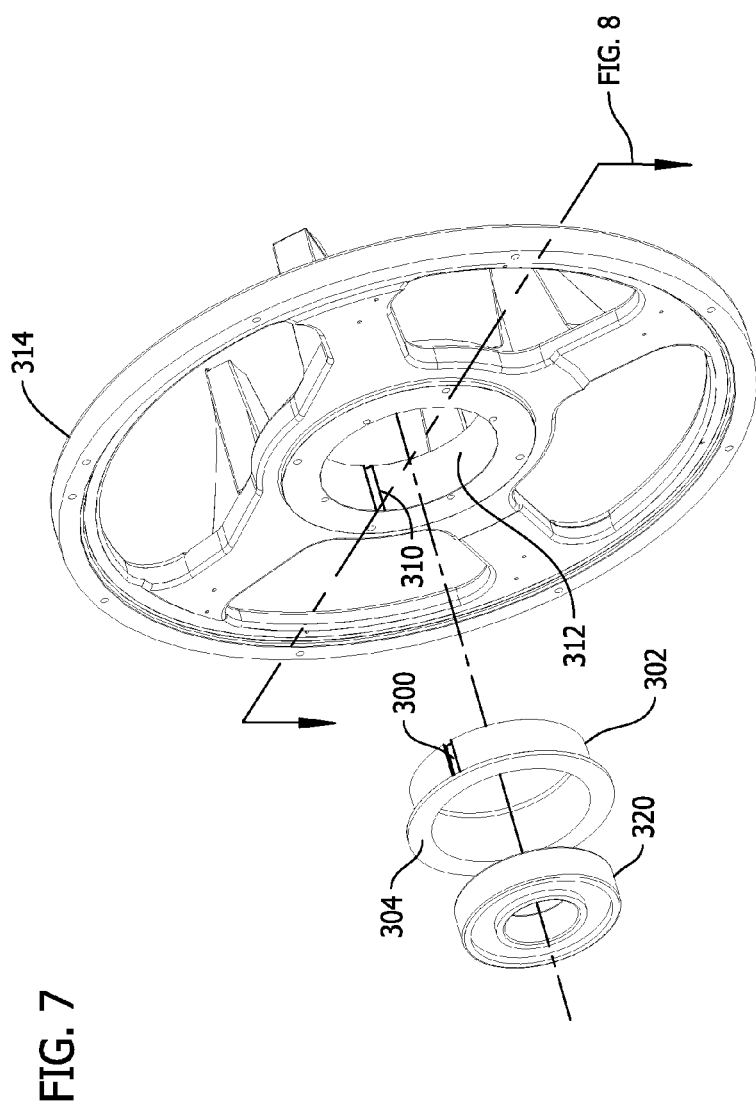
FIG. 7 is an illustration of a third exemplary bearing assembly.
Figure 8:
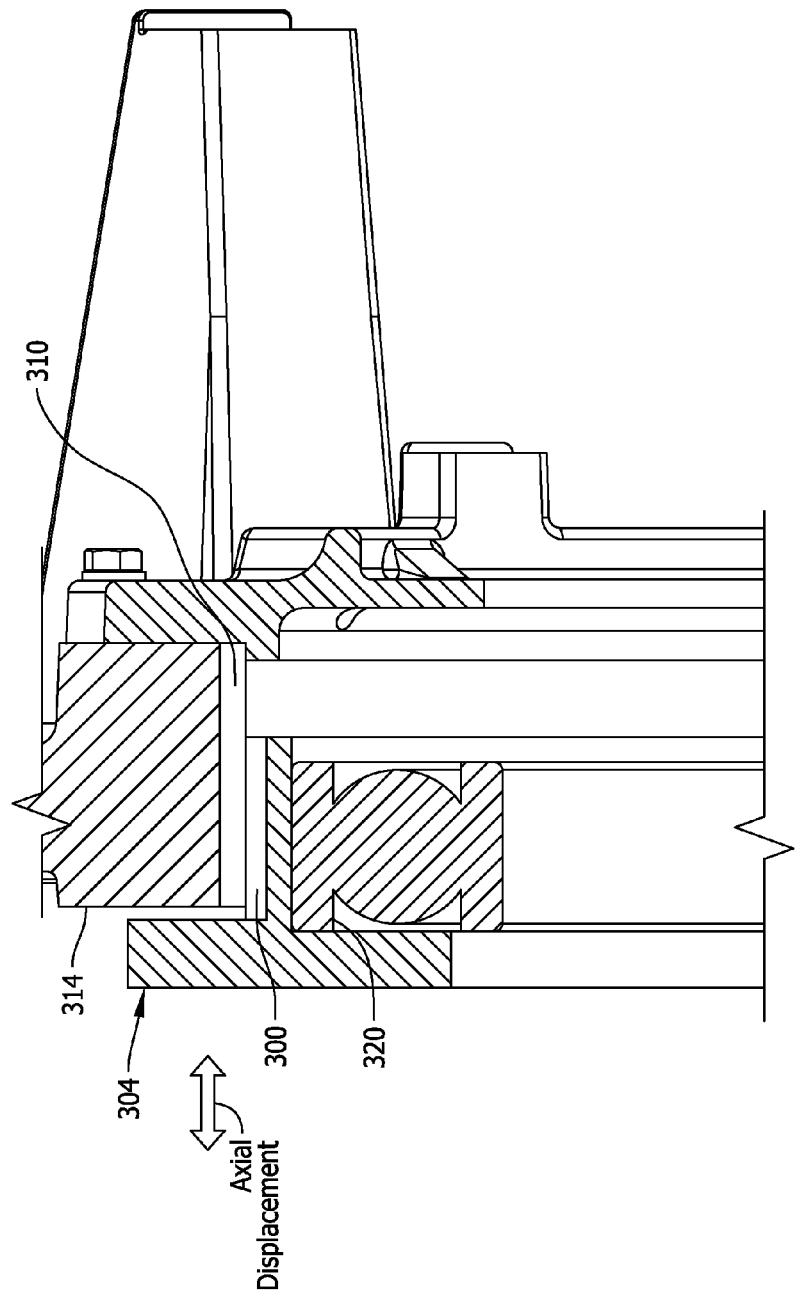
FIG. 8 is an enlarged cross-sectional view of the bearing assembly of FIG. 7.

FIG. 7 an exploded view of an alternative embodiment of a bearing assembly, which also may be utilized in any of the motors described and/or mentioned above. FIG. 8 is an enlarged cross-sectional view of the bearing assembly of FIG. 7. In the embodiment shown in FIGS. 7 and 8, a first keyway portion 300 is cut in the outer surface 302 of the sleeve 304 and a second keyway portion 310 is cut in the bearing engaging surface 312 of the motor end member 314 to prevent rotation of the sleeve 304 and therefore rotation of the bearing outer race 320. Still another alternative embodiment, similar to that illustrated in FIGS. 7 and 8 uses pins or protrusions in a lip located in the sleeve that match up with holes or slots in the motor end member to prevent rotation of the sleeve and therefore rotation of the bearing outer race. Such an embodiment is therefore similar to the embodiment of FIGS. 7 and 8.

Multiple configurations for maintaining a rotational position between the bearing float sleeve and the bearing seat in the motor end member are similar to those described with respect to FIGS. 7 and 8. In the embodiment of FIGS. 7 and 8, a keyway portion 300 is cut in the outer surface 302 of the sleeve 304 and a second keyway portion 310 is cut in the bearing engaging surface 312 of the motor end member 314. The corresponding keyways and a key (not shown) are utilized to lock the rotation of the sleeve 304 while allowing a slip fit between the outer surface of the sleeve 304 and the bearing engaging surface 312 of the motor end member 314 to allow the bearing to float axially (as indicated by the arrow shown in FIG. 8).

Similarly, one or more cast protrusions on the outer surface 302 of the sleeve 304 would prevent rotation once they engage similar protrusions casts into the bearing engaging surface 312 of the motor end member 314. In such a configuration, the outer surface 302 of the sleeve 304 would have a slip fit with the bearing engaging surface 312 of the motor end member 314 to allow the bearing to float axially.

In one embodiment, a pin pressed axially into the outer diameter of the bearing sleeve 304 or the bearing engaging surface 312 of the motor end member 314 would locate into a pocket in the corresponding bearing sleeve 304 or the bearing engaging surface 312 of the motor end member 314 that would allow for some rotation until the pin would stop on the ends of the pocket while allow the bearing to float axially. In another embodiment, a head of a bolt threaded into either the outer surface 302 of the sleeve 304 or the bearing engaging surface 312 of the motor end member 314 would operate in the same manner if the pocket in the corresponding component were so sized.

In an embodiment, a hole or slot in a radial protruding face of the sleeve 304 prevents rotation by interfering with a protruding feature or a shoulder on a bolt axially oriented on the face of the bearing seat of the motor end member 314. A vertical notch in the sleeve 304 interfaces with a vertical pin or helical spring, preventing the rotation of the outer race of the bearing with the axial float allowed due to a slip fit between the outer diameter of the sleeve and the ID of the bearing bracket. In a similar embodiment, rotation of the outer race is stopped by placing a long helical spring axially in the sleeve 304 which is configured to locate and engage a corresponding pocket in the bearing seat of motor end member 314 to prevent rotation and provide a preload on the bearing. Axial float is provided by the slip fit between the outer diameter of the bearing sleeve and the inner diameter of the bearing seat of the motor end member.

In another embodiment, a rubber wedge is located between the outer surface 302 of the sleeve 304 and bearing engaging surface 312 of the motor end member 314 to prevent rotation of the outer race and the sleeve 304 while allowing the axial float of the bearing. Alternatively, a set of o-rings may be located on the outer surface 302 of the sleeve 304 such that they engage the bearing engaging surface 312 of the motor end member 314. Such o-rings are manufactured with enough stiffness to prevent the outer surface 302 of the sleeve 304 from contacting the bearing engaging surface 312 of the motor end member 314, providing an insulating barrier between the sleeve 304 and the motor end member 314. An additional o-ring between a radially protruding face on the sleeve 304 and a face of the bearing seat in the motor end member 314 also operates to prevent contaminates from entering the bearing.

While described in the preceding several paragraphs as embodiments to prevent rotation between a bearing sleeve fixed on a bearing and a motor end member, those skilled in the art will realize that many of the described embodiments can be incorporated directly onto the outer race of the bearing such that a bearing sleeve is not needed. For example, a fixed o-ring on the outer race of the bearing or a rubber wedge between the outer race of the bearing and the bearing engaging surface 312 of the motor end member 314 may be utilized. In addition, an insulating surface between the outer race of the bearing and the inner surface of the bearing sleeve 304 may be utilized. This has the advantage over other methods of insulating in that the insulating surface is provided between two surfaces that do not have relative motion between them, increasing the reliability and lowering the cost of the insulation system.

All of the configurations and embodiments described herein move the wear surface away from the outer race of the bearing, increasing the surface area of the wear contact area. The embodiments also include provisions for locking the outer race of the bearing and eliminating any rotational movement between the wear surfaces. The bearing is also electrically insulated from the bracket without the insulating surfaces experiencing any wear.

All of the described embodiments allows for axial movement of the bearing, through axial movement of the sleeve, which allows for differential thermal growth without creating any additional load on the bearing. The described embodiments are especially applicable to most large generator products and may additionally be used on large motor products. However, the embodiments may also be utilized on smaller motor and generator products.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing assembly for an electric motor comprising:
a bearing comprising an inner race and an outer race; and
a bearing float sleeve comprising an outer race engaging member, said outer race engaging member comprising an outer surface sized for slip fit engagement with a bearing seat formed in a motor end member such that said bearing float sleeve can be displaced axially in relation to the bearing seat and an inner surface configured for engagement with said bearing outer race such that said bearing outer race is in a fixed rotational position with respect to said bearing float sleeve, said bearing float sleeve comprising at least one feature operational to maintain a fixed rotational position of said bearing float sleeve with respect to the motor end member.

2. The bearing assembly according to claim 1 wherein said at least one feature comprises a flange extending substantially perpendicularly from said outer race engaging member, said flange configured to maintain a fixed rotational position with respect to the motor end member.

3. The bearing assembly according to claim 2 further comprising a plurality of dowel pins, said flange comprising a plurality of flange holes formed therein corresponding to a plurality of motor end holes formed in the motor end member, both said plurality of flange holes and the plurality of motor end holes configured for engagement with said plurality of dowel pins.

4. The bearing assembly according to claim 3 wherein said plurality of dowel pins and said flange allow for an amount of axial movement of said bearing float sleeve with respect to the motor end member.

5. The bearing assembly according to claim 2 further comprising a plurality of dowel pins, the motor end member comprising holes formed therein for engagement with said plurality of dowel pins and said flange comprising a plurality of slots formed therein for engagement with said plurality of dowel pins such that said bearing float sleeve is maintained in the fixed rotational position with respect to the motor end member.

6. The bearing assembly according to claim 5 wherein said plurality of dowel pins and said slots allow for an amount of axial movement of said bearing float sleeve with respect to the motor end member.

7. The bearing assembly according to claim 1 further comprising a key and wherein said outer surface of said outer race engaging member comprises a first keyway portion configured for alignment with a second keyway portion formed in the bearing seat, said key configured for insertion into the first and the second keyway portions.

8. The bearing assembly according to claim 1 wherein said outer surface of said outer race engaging member comprises a member formed thereon, said member configured for engagement with a corresponding feature associated with the bearing seat of the motor end member.

9. The bearing assembly according to claim 1 wherein said outer surface of said outer race engaging member comprises a member attached thereto, said member configured for engagement with a corresponding feature associated with the bearing seat of the motor end member.

10. A method for preventing relative rotation between an outer race of a bearing and a bearing seat formed in a motor end member of an electric motor, said method comprising:
engaging the outer race of the bearing with an inner surface of a bearing float sleeve such that the bearing outer race is in a fixed rotational position with respect to the bearing float sleeve;
engaging a bearing engaging surface of the bearing seat with an outer surface of the bearing float sleeve, the outer surface sized such that the bearing float sleeve can be displaced axially in relation to the bearing seat; and
providing an engagement between the bearing float sleeve and the motor end member such that the bearing float sleeve and the motor end member are in a fixed rotational position with respect to one another.

11. The method according to claim 10 wherein providing an engagement between the bearing float sleeve and the motor end member comprises attaching a flange extending substantially perpendicularly from an outer race engaging member of the bearing float sleeve to the motor end member.

12. The method according to claim 11 wherein attaching a flange comprises:
inserting a first end of a first dowel pin into a first hole formed in the motor end member; and
inserting a second end of the first dowel pin into at least one of a first hole and a first slot formed in the flange while maintaining the first end of the first dowel pin in the first hole formed in the motor end member.

13. The method according to claim 10 wherein providing an engagement between the bearing float sleeve and the motor end member comprises allowing for an amount of axial movement between the bearing float sleeve and the motor end member.

14. The method according to claim 10 wherein providing an engagement between the bearing float sleeve and the motor end member comprises inserting a key into corresponding keyway portions formed in the bearing seat of the motor end member and the outer surface of the bearing float sleeve.

15. The method according to claim 10 wherein providing an engagement between the bearing float sleeve and the motor end member comprises engaging a member on an outer surface of the bearing float sleeve with a corresponding feature associated with the bearing seat of the motor end member.

16. The method according to claim 10 wherein providing an engagement between the bearing float sleeve and the motor end member comprises placing a member about an outer surface of the bearing float sleeve, the member operable to engage the bearing seat of the motor end member and maintain a fixed rotational position between the motor end member and the bearing float sleeve once engaged.

17. An electric motor comprising:
a motor end member comprising a bearing seat formed therein, said bearing seat comprising a bearing engaging surface;
a bearing comprising an inner race and an outer race; and
a bearing float sleeve comprising an outer race engaging member, said outer race engaging member comprising an outer surface sized for slip fit engagement with said bearing engaging surface such that said bearing float sleeve can be displaced axially in relation to said bearing seat and an inner surface configured for engagement with said outer race such that said bearing outer race is in a fixed rotational position with respect to said bearing float sleeve, said bearing float sleeve comprising at least one feature operational to maintain a fixed rotational position of said bearing float sleeve with respect to said motor end member.

18. The electric motor according to claim 17 wherein said at least one feature comprises a flange extending substantially perpendicularly from said outer race engaging member, said flange configured to maintain a fixed rotational position with respect to said motor end member.

19. The electric motor according to claim 17 wherein said at least one feature comprises:
a flange extending substantially perpendicularly from said outer race engaging member; and
a plurality of dowel pins, said motor end member comprising holes formed therein for engagement with said plurality of dowel pins, said flange comprising at least one of holes and slots formed therein for engagement with said plurality of dowel pins.

20. The electric motor according to claim 17 wherein said outer surface of said bearing float sleeve and said bearing engaging surface of said bearing seat comprise corresponding features operable to maintain said bearing float sleeve in a fixed rotational position with respect to said motor end member.

21. The method according to claim 12 wherein attaching a flange further comprises:
inserting a first end of a second dowel pin into a second hole formed in the motor end member; and
inserting a second end of the second dowel pin into at least one of a second hole and a second slot formed in the flange while maintaining the first end of the second dowel pin in the second hole formed in the motor end member.

* * * * *